US006857962B2

(12) United States Patent
Weedon

(10) Patent No.: US 6,857,962 B2
(45) Date of Patent: Feb. 22, 2005

(54) BLIND THREADED FASTENER FORMING TECHNIQUE

(75) Inventor: Michael J. Weedon, Newhall, CA (US)

(73) Assignee: AVK Industrial Products, a division of SPS Technologies Inc., Valencia, CA (US)

( * ) Notice: Subject to any disclaimer, the term of this patent is extended or adjusted under 35 U.S.C. 154(b) by 61 days.

(21) Appl. No.: 10/313,800

(22) Filed: Dec. 6, 2002

(65) Prior Publication Data

US 2004/0110569 A1 Jun. 10, 2004

(51) Int. Cl.[7] .................................................. B21K 1/44
(52) U.S. Cl. .............................. 470/31; 420/27; 420/29
(58) Field of Search ............................ 470/18, 21, 25, 470/26, 27, 28, 29, 31, 32, 33, 89, 91, 123; 411/34

(56) References Cited

U.S. PATENT DOCUMENTS

| | | |
|---|---|---|
| 1,164,322 A | 12/1915 | Yeatman |
| 2,017,421 A | 10/1935 | Post |
| 3,180,203 A | 4/1965 | Vaughn |
| 3,253,495 A * | 5/1966 | Orloff ........................... 411/34 |
| 3,759,080 A * | 9/1973 | Sugahara et al. .............. 72/356 |
| 3,834,270 A | 9/1974 | Triplett et al. |
| 3,951,561 A | 4/1976 | Speakman |
| 4,499,647 A | 2/1985 | Sakamura et al. |
| 4,557,649 A | 12/1985 | Jeal |
| 4,580,936 A * | 4/1986 | Francis et al. ................. 411/38 |
| 4,586,231 A * | 5/1986 | Powderley et al. ........... 29/416 |
| 4,635,310 A * | 1/1987 | Kendall ........................ 470/11 |
| 4,741,091 A | 5/1988 | Settles |
| 4,770,585 A | 9/1988 | Astl |
| 4,875,815 A | 10/1989 | Phillips, II |
| RE33,809 E | 1/1992 | Okada et al. |
| 5,078,561 A | 1/1992 | Wollar et al. |
| 5,180,264 A | 1/1993 | Farwell |
| 5,246,323 A | 9/1993 | Vernet et al. |
| 5,294,223 A | 3/1994 | Phillips, II |
| 5,690,454 A | 11/1997 | Smith |
| 5,919,016 A | 7/1999 | Smith et al. |
| 5,947,630 A | 9/1999 | Dillon |
| 6,287,044 B1 | 9/2001 | Huber |
| 6,308,544 B1 * | 10/2001 | Kuehnl et al. ................ 470/27 |
| 6,447,399 B1 * | 9/2002 | Denham ....................... 470/29 |

* cited by examiner

Primary Examiner—Ed Tolan
(74) Attorney, Agent, or Firm—Fulwider Patton Lee & Utecht, LLP

(57) ABSTRACT

A simplified method for producing internally threaded blind fasteners includes cold forming of the thin deformable walls of the fastener into bowed out sections by reverse extrusion to form deep grooves, and subsequent further cold forming to increase the diameter of this thin walled portion of the fastener to form it into bowed out sections. Three or more or even five or more sections may be formed, to increase the "pull-out" resistance by increasing the "footprint" of the deformed sections of the blind fastener.

21 Claims, 5 Drawing Sheets

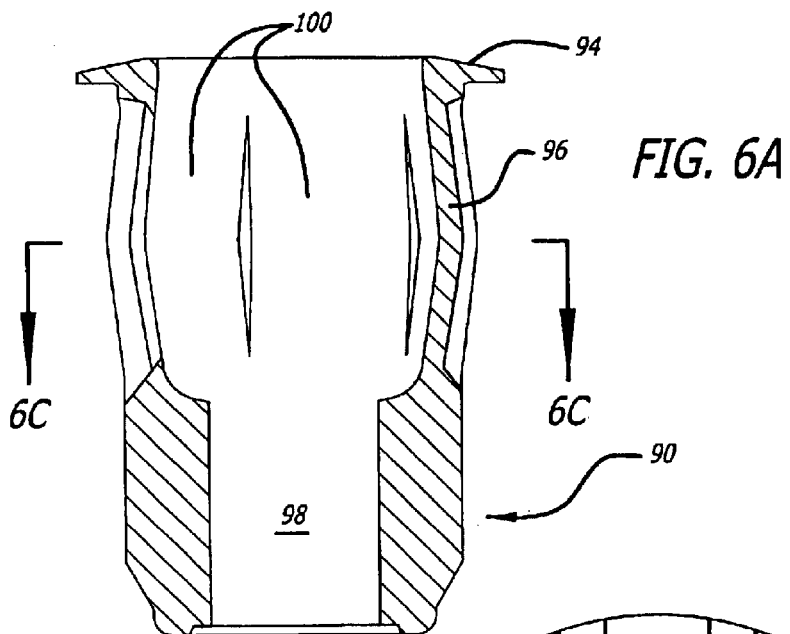
FIG. 6A
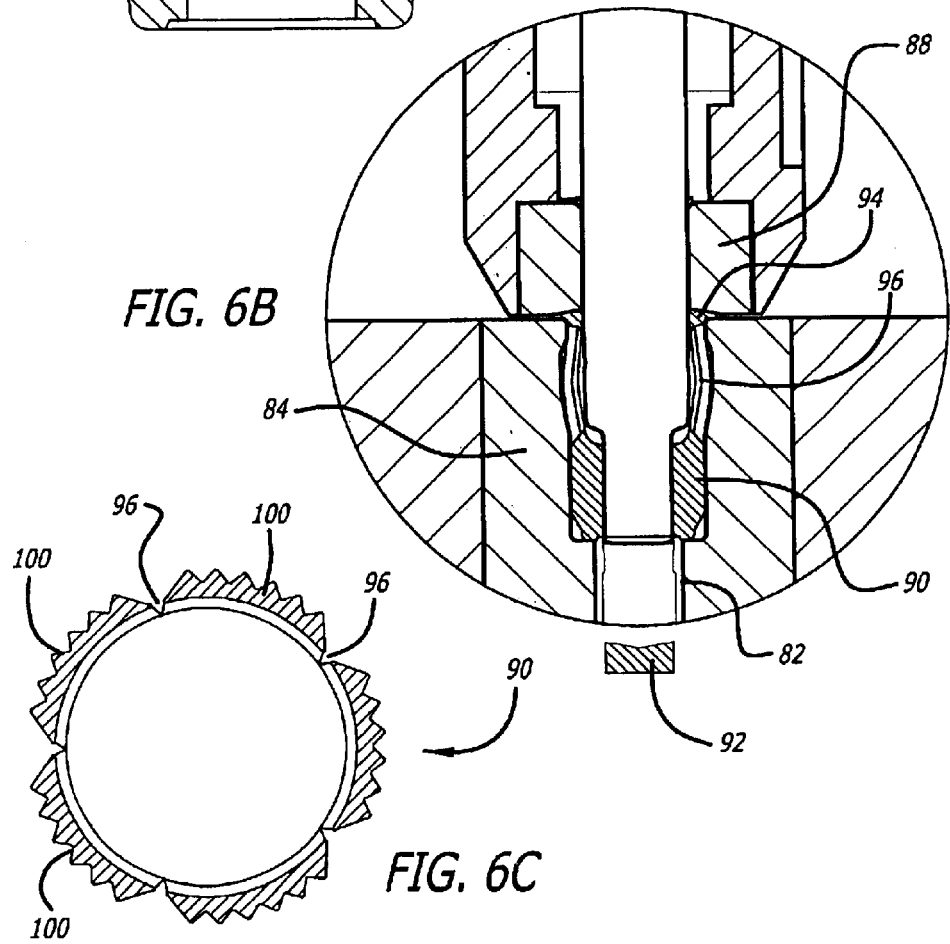
FIG. 6B
FIG. 6C

BLIND THREADED FASTENER FORMING TECHNIQUE

FIELD OF THE INVENTION

This invention relates to a method for making blind threaded fasteners, and to the resultant fastener.

BACKGROUND OF THE INVENTION

Blind threaded fasteners are known, and they involve fasteners which are intended for use on metal or plastic sheets or panels, particularly where one side of the sheet or panel is not readily accessible. The fasteners often involve an enlarged head, an internally threaded outer end, and an intermediate, thin-walled hollow tube interconnecting the head and the threaded outer portion. The fastener is mounted into a hole in the panel. A drive screw extends through the thin walled hollow tube and the drive screw is rotated to pull the threaded portion of the fastener toward the panel, with the result being that the thin walled tubular part of the fastener collapses, extending outward beyond the hole, and the fastener is securely held in the panel by the head on the accessible side of the panel, and the enlarged collapsed portion of the fastener on the inaccessible side of the panel.

It has previously been proposed to manufacture blind fasteners of this type by initial cold forming steps in a header type machine, subsequently cutting four longitudinally extending slits in the thin tubular material, using inwardly directed blades, and in a further step, bowing the resultant sections of the tube slightly outward.

SUMMARY OF THE INVENTION

However, the foregoing method and the resultant fasteners have certain shortcomings. For example the various steps required in separate machines makes the fasteners unduly expensive; and excessive time and space are needed to manufacture the completed blind fastener. In addition, the tube slitting step may form burrs which may interfere with a subsequent plating process, resulting in incomplete plating, so that the fasteners may corrode and fail. In addition, it is not convenient to form more than four slits in the separate slitting process, and the resultant fastener has concentrated forces which may damage thin plastic sheets into which the fasteners may be secured.

In accordance with one aspect of the invention, the longitudinal slitting and the outward bowing of the tubular section of the fastener are all accomplished by cold metal forming, preferably in machines of the general type used to make conventional threaded bolts with heads. These machines are known as "headers" and they are expensive, noisy and may cost several hundred thousand dollars. One well known manufacturer of multi-station header type machines is Sacma, based in Italy near Milan.

Returning to the process, the longitudinal splits in the tubular intermediate portion of the fastener are formed in part by inwardly directed protrusions on the header die and backward extrusion of the metal from the deepening central opening in an intermediate step of cold forming the fastener. In a later step included in a multiple station header, the head of the fastener is more completely formed and the tubular sections are fully separated and are bowed slightly outward.

The resultant fastener body is fully cold formed, and may have as many outwardly extending sections, such as 5 or 6, as may be desired, to spread the area of the retention portion of the fastener. In addition, in the absence of the cutting burrs, the fastener is smoothly formed and shaped to receive a complete plating coating thereby avoiding possible corrosion and failure.

In accordance with one preferred method illustrating the principles of the invention, a blind threaded fastener may be formed from coils or rods of heavy cylindrical stock by the following steps:

1. Cut off slug of generally cylindrical configuration.
2. Cold forming slug to size while starting a central recess.
3. Deepening the central recess and initial formation of flange or head of fastener.
4. The knurling and vertical slits are accomplished by inwardly directed portions of the header die, and backward extrusion of the metal as the central opening through the fastener is enlarged.
5. The final cold forming step punches out the small central slug of metal closing the end of the fastener, completes the flange or head of the fastener, and bows out the previously formed sections of the tubular portion of the fastener.

It is noted in passing that the length of the completed fastener may be double the length of the initial cylindrical slug, for example, a ⅜ inch long cylindrical slug may be formed into a ¾ inch long fastener.

Following the cold forming steps outlined above, the fasteners may be annealed to reduce or eliminate work hardening in the side walls which are to be deformed, and internal threads at the outer end of the fastener are roll formed to provide some work hardening. Subsequently, depending on the material of the fasteners, they may be plated. Concerning materials, the fasteners may typically be formed of steel, brass, monel or other metals; and they may be plated with zinc, tin, gold, or in some cases nickel. A zinc coating on steel fasteners, to avoid corrosion, is commonly employed.

The fastener need not be knurled, but are preferably knurled to resist rotation relative to the panel or wall into which they are mounted. This knurling may be accomplished as part of one step in a multi-station header machine. Also, as mentioned above, the fastener may have 3 or more or even 5 or more separate "back-side" locking sections to increase the "pull-out" or resistance force when an outward force is applied to the fastener.

Other objects, features and advantages will become apparent from a consideration of the following detailed description and the accompanying drawings.

BRIEF DESCRIPTION OF THE DRAWINGS

FIG. 6A represents the final formed fastener product as it would leave the multi-station header machine;

FIG. 6B represents the die configuration resulting in the fastener product shown in FIG. 6A; and FIG. 6C is a cross-sectional view taken along plane C—C of FIG. 6A, and showing the side wall sections being bowed out slightly and separated from adjacent side wall sections.

DETAILED DESCRIPTION OF THE PREFERRED EMBODIMENTS

While the specification describes particular embodiments of the present invention, those of ordinary skill can devise variations of the present invention without departing from the inventive concept.

Figure 1A:
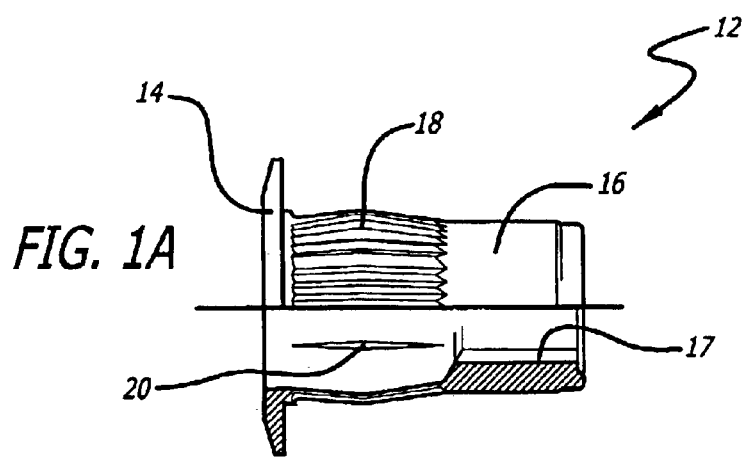
FIG. 1A is sideview of a fastener with the lower half thereof being shown in cross-section, made in accordance with the principles of the present invention.

Referring more particularly to the drawings, FIG. 1A shows a fastener 12 in a partial or one quarter cutaway cross-sectional configuration. The fastener 12 includes the head 14 and outer portion 16 which is internally threaded as indicated at reference numeral 17, and an intermediate knurled section 18 which has been divided into five sections as indicated by the cut 20. It may also be noted that the side wall sections 18 between the threaded section 16 and the head 14 have been bowed outward to some extent.

Figures 1B, 1C:
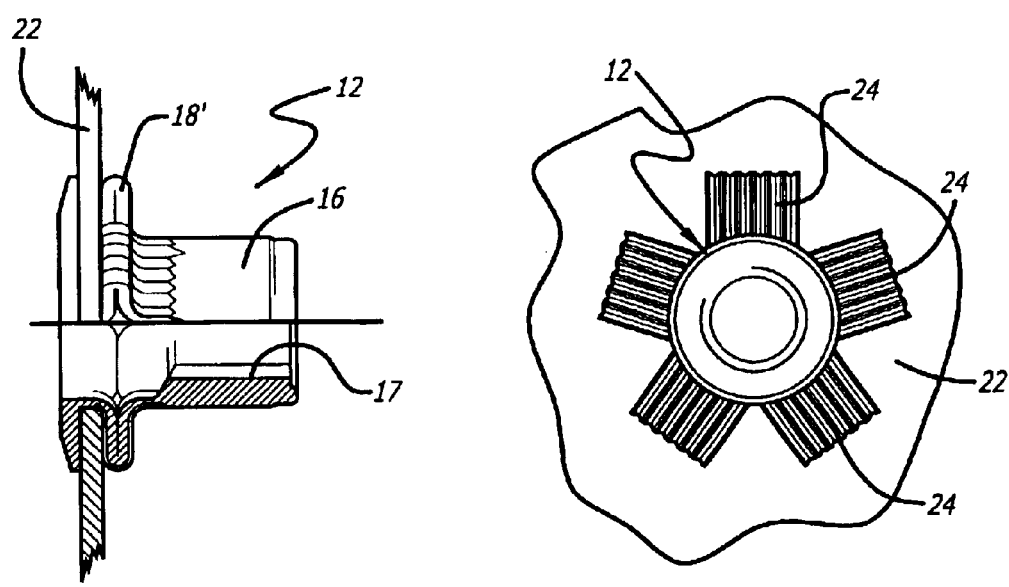
FIG. 1B is a partial cross-sectional view of the fastener of FIG. 1A after it has been installed in an opening through a panel or wall.
FIG. 1C is a end view of the installed fastener of FIG. 1B showing how the collapsed side walls of the fastener engage the inaccessible side of the panel.

Referring now to FIG. 1B of the drawings, the blind fastener of FIG. 1A has been installed into a panel or wall 22 having an accessible side to the left as shown in FIG. 1B, and an inaccessible side shown to the right FIG. 1B. In practice, to install the fastener 18, it is initially mounted through a hole in panel 22. A threaded screw-like part is then threaded into the internal threads 17 at the outer end 16 of the fastener 12, and is pulled to the left as shown in FIG. 1B so that the outwardly bowed walls 18' collapse and engage the inner, inaccessible side of the panel 22. The outwardly bowed sections which will be designated by the reference numeral 24 in FIG. 1C are uniformly collapsed outwardly, as shown in FIG. 1C. The view of FIG. 1C is that of the fastener and panel assembly of FIG. 1B as viewed from the right hand side of FIG. 1B.

In the following portion of the specification, the successive cold forming steps of which the final fastener body is formed will be described. It is noted that the material such as steel wire of a circular cross-section is normally received at the multi-station header machine in the form of rolls or coils of metal, or in some cases for large fasteners, in the form of rods of metal. They are initially cut off into short sections or cylindrical slugs for processing by the heading machine which cold forms the material into the basic fastener configuration.

Figure 2A:
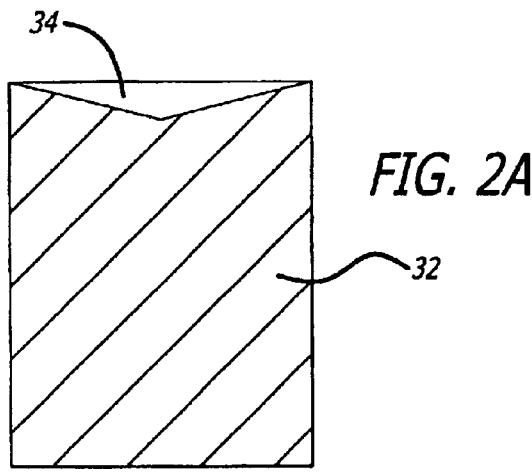
FIG. 2A shows a slug of metal of cylindrical configuration which has been initially formed with a slight indentation on one end.
Figure 2B:
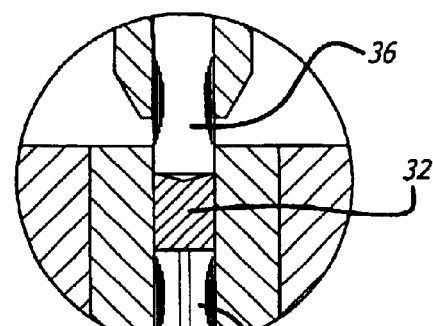
FIG. 2B is a cross-sectional view showing the die configuration by which the slug of FIG. 2A is formed.

Referring now to FIGS. 2A and 2B, the initial station of the cold heading machine forms the short slug of material into the slug 32 as shown in FIG. 2A, with an initial recess 34 in the upper end of the slug.

Referring to FIG. 2B, the lower end of the die cavity is formed by the plug 34. In this die assembly, the punch 36 is actively moved into stamping engagement with the work piece 32 thereby forcing the work piece 32 to move backward and radially, and simultaneously reducing its length to stabilize the diameter and the length of the work piece 32. The work piece, following the initial forming step, is transferred to the next station of the header machine.

Figure 3A:
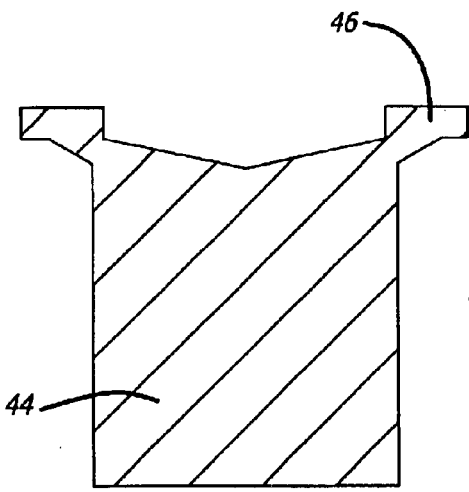
FIG. 3A shows the slug of FIG. 2A following an additional cold forming step by which the flange of the fastener is initially fully formed, and the central recess is further depressed.
Figure 3B:
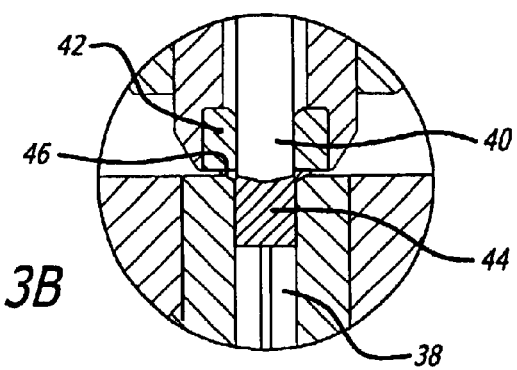
FIG. 3B is the die configuration by which the intermediate fastener configuration of FIG. 3A is formed.

Reference will now be made to FIGS. 3A and 3B of the drawings. In the die structure of FIG. 3B, the lower end of the die cavity is closed by the plug 38. The punch 40 supported by the sleeve 42 is actively moved into stamping engagement with the work piece 44, thereby forcing the upper end of the work piece 44 be moved upward and radially coming into contact with the sleeve 42. The punch 40 and the sleeve 42 continue to move downward, deepening the recess and forming the flange 46. The resultant intermediate product is shown in FIG. 3A.

Figure 4A:
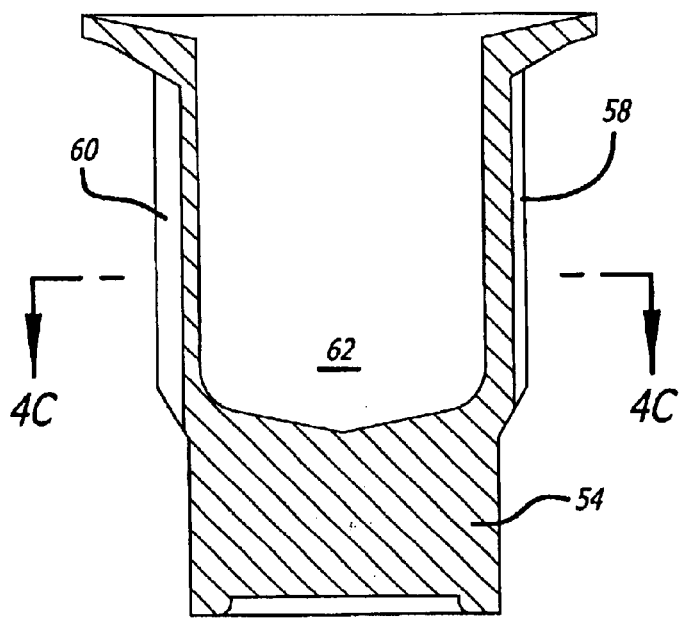
FIG. 4A is a cross-sectional view of a further intermediate stage of the formation of the fastener.
Figure 4B:
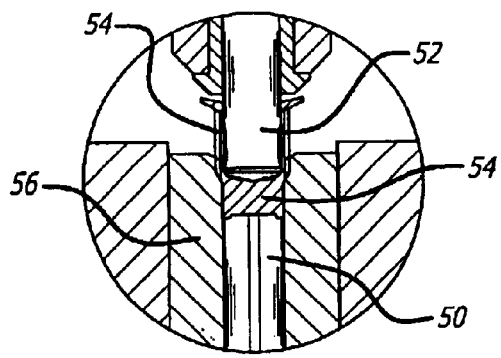
FIG. 4B shows the die configuration by which the fastener configuration of FIG. 4A is formed, involving a backward extrusion step.
Figure 4C:
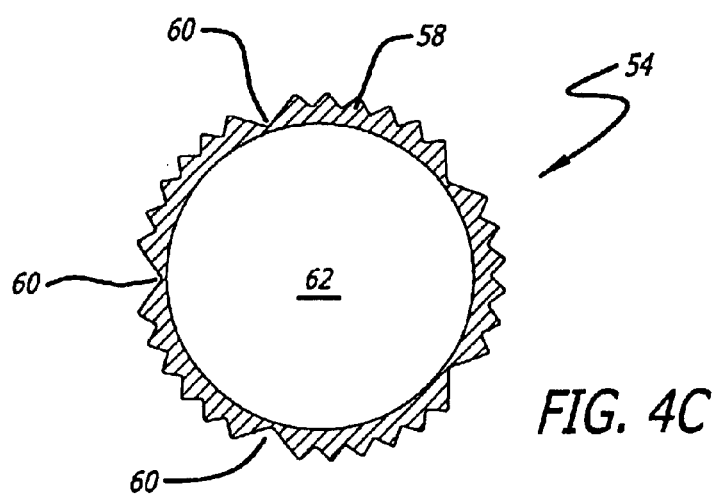
FIG. 4C is a cross-sectional view taken along plane C—C of FIG. 4A.

Referring now to FIGS. 4A through 4C, particularly with reference to 4B, the lower end of the cold forming die cavity is closed by the plug 50. In this die assembly, the punch 52 is actively moved into stamping engagement with the work piece 54. The recess previously formed in the second header station, is deepened by backward extrusion, simultaneously forming the deep axial grooves in the periphery of the work piece 54 by the configuration of the upper inner corners of the die member 56.

The resultant part 54 as shown in FIG. 4A includes the relatively shallow knurling of 58 and the deeper grooves 60. In addition, the central recess 62 has been deepened. FIG. 4C is a cross-sectional view taken along lines C—C of FIG. 4A. The knurling 58 and the deeper grooves 60 may be clearly seen in FIG. 4C. It is also noted that the die part 56 at its upper inner corners has a configuration which is complementary to the sectional configuration of FIG. 4C, as the knurling 58 and deep grooves 60 are formed by this backward extrusion along the inner corners of the die part 56.

Figure 5A:
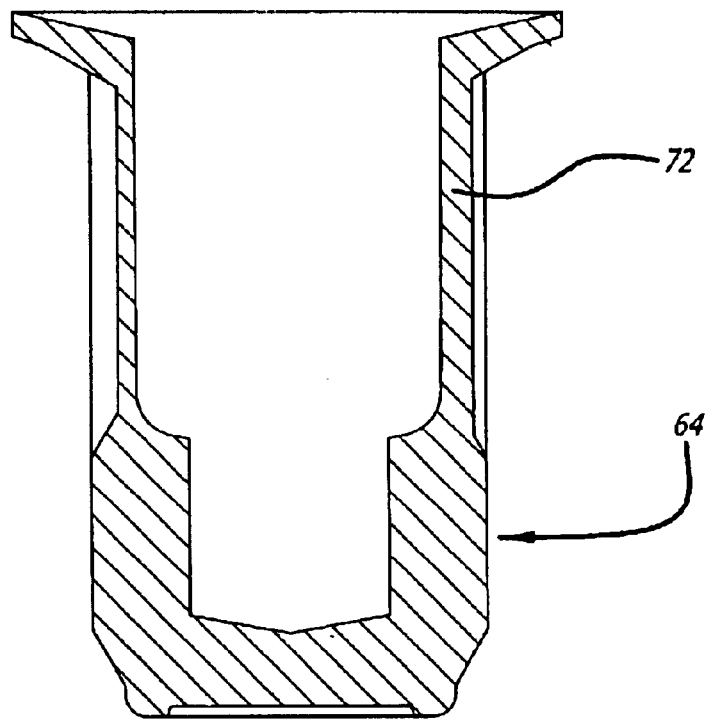
FIG. 5A represents the next step in the fastener formation, with the central opening being deepened as compared with FIG. 4A, for example.
Figure 5B:
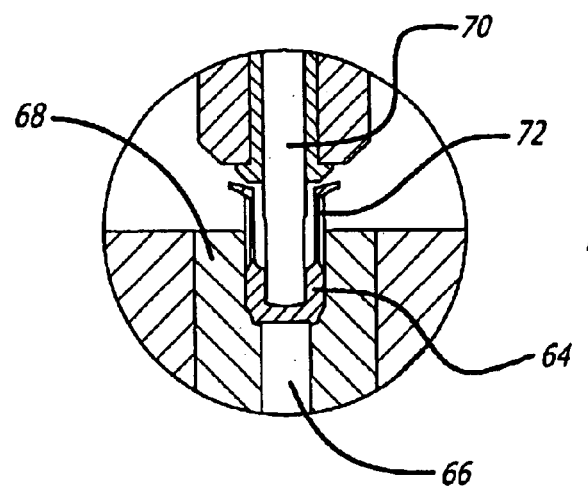
FIG. 5B is the die configuration resulting in the intermediate product of FIG. 5A.

Reference will now be made to FIGS. 5A and 5B of the drawings. In FIG. 5B, the work piece 64 has been transferred from the prior station of the header machine. The lower end of the die cavity is closed by the plug 66. In this die assembly 68, the punch 70 is actively moved into stamping engagement with the work piece 64. The smaller blind recess, at the bottom of the work piece 64 is formed by backward extrusion, simultaneously forcing the outside diameter of work piece 64 to move radially, filling the die cavity at the lower end thereof, with the die cavity having a somewhat greater diameter than the upper side walls 72 of the work piece 64.

Reference will now be made to FIGS. 6A, 6B, and 6C. FIG. 6B represents the fifth and last station of the multi-station header apparatus. The lower end of the die includes the cylindrical sleeve 82. In this die assembly 84, the punch 86, supported by the sleeve 88, is actively moved into stamping engagement the work piece 90. This action forces the punch 86 to pierce the lower end of the blind recess, pushing the small slug 92 through the sleeve 82. Simultaneously the head 94 is formed from the flange by the sleeve 88 which forces the larger bored recess of the fastener to move radially as indicated by reference numeral 96, opening up the deep grooves to form controlled axially splits 96, as seen to advantage in FIG. 6C of the drawings. Incidentally, the reduced diameter opening 98 is subsequently roll formed to produce internal threads, with the roll forming providing some work hardening for the threads. This threading step follows an annealing step which reduces or eliminates work hardening for the thin wall sections 100, so that they will readily bend as indicated in FIGS. 1B and 1C.

Incidentally, concerning multi-station heading machines, the work pieces are normally transferred successively from station to station by known arrangements, with successive cold forming steps taking place at successive stations, and with all of the punch members being actuated concurrently.

It is to be understood that the foregoing detailed description and the accompanying drawings relate to one illustrative preferred embodiment of the method of the present invention. Various changes and modifications may be made without departing from the spirit and scope of the invention. Thus, by way of example and not of limitation, instead of a single multi-station header machine, the cold forming may be done in various successive machines. Further, the particular operations which are accomplished in successive stages may be shifted somewhat with more or less being accomplished at each station and with additional or fewer stations being required for the cold formation process, depending largely on the configuration of the fasteners. Also, depending on the application, the thickness of the panel into which the fasteners are to be secured, and other factors, the length of the thin walled slit section of the fastener may be increased or decreased, or the number of sections modified. In addition, in some cases the threads at the outer end of the fastener may be formed by cutting, using a tap, and an appropriate support for the cylindrical outer surface of the die, if necessary. Accordingly, the present invention is not limited to the exact embodiments shown in the drawings and described in detail hereinabove.

What is claimed is:

1. A method for forming a blind fastener comprising the steps of:
   (a) cutting off a generally cylindrical slug of metal from a length of cylindrical metal stock;
   (b) cold forming the metal slug to size while starting a central recess;
   (c) deepening the central recess and initial formation of the flange or head of the fastener by further cold forming;
   (d) cold forming knurling and longitudinal cuts substantially through the side walls of the fastener using a cylindrical punch and a mating die having corners formed with a knurl shaped and sharp inwardly directed points, said knurling and cuts being formed by backward extrusion over said corners of said mating die; said mating die being substantially cylindrical for the greater part of its depth; the diameter of the fastener being initially substantially equal to the diameter of the cylindrical portion of said die, and the engagement with said inwardly directed points being substantially limited to the backward extrusion;
   (e) completing the fastener flange, or head, bowing out sections of the side walls, and punching out a small central slug of metal to fully open the center of the fastener, all by a cold forming step;
   wherein the foregoing steps are performed in a single multi-station header type; and
   removing the completed fastener from said header with the sections remaining somewhat bowed out.

2. A method as defined in claim 1 wherein the fasteners are subsequently annealed.

3. A method as defined in claim 1 wherein internal threads are roll formed at the end of the fastener remote from the head thereof.

4. A method as defined in claim 1 wherein the fastener is completely plated.

5. A method as defined in claim 1 wherein all steps (b) through (e) are performed concurrently on different fasteners at different stations of a multi-station header type machine.

6. A threaded blind fastener formed by the method of claim 1.

7. A method as defined in claim 1 wherein the inwardly directed points are limited to the upper corners of said die.

8. A threaded blind fastener comprising:
   a thin walled body portion;
   a head at one end of said body portion;
   a cold rolled internally threaded outer portion at the other end of said body portion;
   said thin walled body portion being cold formed into spaced, separate bowed-out sections by reverse or backward extrusion; and
   said fastener being annealed to facilitate collapsing of said sections.

9. A fastener as defined in claim 8 wherein said fastener includes at least 5 of said sections.

10. A fastener as defined in claim 8 wherein said fastener is burr-free and is fully plated.

11. A method for forming a blind fastener comprising the steps of:
   cold forming a generally cylindrical metal slug to size while starting a central recess;
   deepening the central recess and starting the formation of the flange or head of the fastener by further cold forming;
   cold forming longitudinal cuts substantially through the side walls of the fastener by reverse extrusion over upper sharp corners of a substantially cylindrical die; and said step of forming said wall sections starting with the diameter of said die including said corners being substantially equal to the diameter of said fastener walls;
   completing the fastener flange, or head, bowing out sections of the side walls, and punching out a small central slug of metal to fully open the center of the fastener, all by cold forming.

12. A method as defined in claim 11 wherein the fasteners are subsequently annealed.

13. A method as defined in claim 11 wherein internal threads are roll formed at the end of the fastener remote from the head thereof.

14. A method as defined in claim 11 wherein the fastener is fully plated.

15. A method as defined in claim 11 wherein all of said steps are performed concurrently on different fasteners at different stations of a multi-station header type machine.

16. A threaded blind fastener formed by the method of claim 11.

17. A method as defined in claim 11 wherein the upper sharp corners are limited to the upper corners of said die.

18. A method of forming a blind fastener in which an intermediate work piece has been prepared having a central recess, comprising the steps of:

deepening the central recess and concurrently cold forming knurling and longitudinal cuts substantially through the side walls of the work piece; by reverse extrusion; said step of forming said wall sections starting with the minor diameter of said die being substantially equal to the diameter of said fastener walls; and bowing out the side walls in separate sections in a further cold forming step to facilitate subsequent deformation of said sections.

19. A method as defined in claim 18 wherein said fastener is formed with a head on one end and internal threads on the other end, whereby said fastener may be secured into a panel or sheet material by collapsing said bowed out sections.

20. A method as defined in claim 18 further comprising the step of fully plating said fastener.

21. A method as defined in claim 18 wherein said method in performed using a multi-stage header type machine.

\* \* \* \* \*

UNITED STATES PATENT AND TRADEMARK OFFICE
CERTIFICATE OF CORRECTION

PATENT NO. : 6,857,962 B2  Page 1 of 1
DATED : February 22, 2005
INVENTOR(S) : Michael J. Weedon It is certified that error appears in the above-identified patent and that said Letters Patent is hereby corrected as shown below:

Column 6,
Line 18, insert -- machine -- after "type".

Signed and Sealed this

Seventh Day of June, 2005

JON W. DUDAS
*Director of the United States Patent and Trademark Office*